(12) United States Patent
Cho et al.

(10) Patent No.: US 8,908,278 B2
(45) Date of Patent: Dec. 9, 2014

(54) OPTICAL SHEET

(75) Inventors: Suhyeon Cho, Seoul (KR); Sangbeum Lee, Seoul (KR); Hyunjoon Kim, Seoul (KR); Wooyoung Chang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 104 days.

(21) Appl. No.: 13/389,930

(22) PCT Filed: Aug. 12, 2010

(86) PCT No.: PCT/KR2010/005314
§ 371 (c)(1),
(2), (4) Date: Apr. 30, 2012

(87) PCT Pub. No.: WO2011/019225
PCT Pub. Date: Feb. 17, 2011

(65) Prior Publication Data
US 2012/0212828 A1  Aug. 23, 2012

(30) Foreign Application Priority Data
Aug. 12, 2009 (KR) .................. 10-2009-0074327

(51) Int. Cl.
  *G02B 5/02*   (2006.01)
  *G02F 1/1335*  (2006.01)

(52) U.S. Cl.
  CPC ........ *G02B 5/0215* (2013.01); *G02F 1/133606* (2013.01); *G02F 2001/133607* (2013.01); *G02B 5/0278* (2013.01)
  USPC .......................................... 359/622

(58) Field of Classification Search
  USPC ................................. 359/619, 622
  See application file for complete search history.

(56) References Cited

U.S. PATENT DOCUMENTS

| | | | |
|---|---|---|---|
| 5,764,315 A * | 6/1998 | Yokota et al. | 349/62 |
| 2006/0126185 A1 | 6/2006 | Oh et al. | |
| 2008/0002261 A1 * | 1/2008 | Hill et al. | 359/619 |
| 2009/0244713 A1 | 10/2009 | Kodera et al. | |

FOREIGN PATENT DOCUMENTS

| | | | | |
|---|---|---|---|---|
| CN | 1834696 A | | 9/2006 | |
| JP | 2007-035531 | * | 2/2007 | ............ G02B 5/02 |
| JP | 2007-035531 A | | 2/2007 | |
| JP | 2007-264393 A | | 10/2007 | |
| JP | 2008-226763 | * | 9/2008 | ............ G02B 3/00 |
| JP | 2008-226763 A | | 9/2008 | |
| JP | 2009-157029 A | | 7/2009 | |
| TW | M291542 U | | 6/2006 | |
| TW | 200827851 A | | 7/2008 | |
| TW | 200848787 A | | 12/2008 | |

OTHER PUBLICATIONS

International Search Report in International Application No. PCT/KR2010/005314, filed Aug. 12, 2010.
Office Action dated Jun. 20, 2013 in Taiwanese Application No. 099126875, filed Aug. 12, 2010.
Office Action dated Jun. 20, 2013 in Chinese Application No. 201080035848.8, filed Aug. 12, 2010.
Office Action dated Aug. 13, 2013 in Japanese Application No. 2012-524644, filed Aug. 12, 2010.

* cited by examiner

*Primary Examiner* — Joseph P Martinez
(74) *Attorney, Agent, or Firm* — Saliwanchik, Lloyd & Eisenschenk

(57) ABSTRACT

The present invention relates to a composite optical sheet, characterized in that two or more optical sheets regularly arranged with micro lenses each having a lens pitch of 1~30 µm are stacked to prevent the moire phenomenon, and brightness-improving sheets with different sizes of lenses are formed to maximize the brightness.

7 Claims, 3 Drawing Sheets

(a)

(b)

(c)

OPTICAL SHEET

CROSS-REFERENCE TO RELATED APPLICATION

This application is the U.S. national stage application of International Patent Application No. PCT/KR2010/005314, filed Aug. 12, 2010, which claims priority to Korean Application No. 10-2009-0074327, filed Aug. 12, 2009, the disclosures of each of which are incorporated herein by reference in their entirety.

TECHNICAL FIELD

The present invention relates to a composite optical sheet used in LCD or OLED.

BACKGROUND ART

Liquid crystal used in the LCD (Liquid Crystal Display) is not a light emitting material which generates its own light by itself but a photospheric material by which an amount of light coming from the outside is modulated to display an image on a screen. Accordingly, the LCD device requires a separate light source, namely, a backlight unit, for radiating light onto an LCD panel. Any complex body capable of irradiating light from a rear surface of a liquid crystal module is called a backlight unit (BLU) or a backlight assembly.

The backlight unit (BLU) is generally divided, according to a position of a light source with respect to a display surface, into an edge type BLU that a lamp is installed on a lateral surface of a liquid crystal panel thus to provide light to a liquid crystal layer, and a direct type BLU that a lamp is installed below a liquid crystal panel thus to directly provide light to a liquid crystal layer.

According to the edge type BLU, a lamp is installed on a side surface of a liquid crystal panel thus to provide light to a liquid crystal layer through a reflector and a light guide panel. Accordingly, the edge type BLU has a thin thickness thereby to be mainly applied to a liquid crystal panel of small and medium areas such as a notebook computer, etc.

According to the direct type BLU, light emitted from a lamp is directly supplied to a liquid crystal layer. Accordingly, the direct type BLU can be applied to a liquid crystal panel of a large area, and a high brightness can be achieved. Therefore, the direct type backlight is mainly used to fabricate a liquid crystal panel for an LCD TV.

FIG. 1 is a schematic view illustrating a configuration of a conventional LCD backlight unit.

Referring to FIG. 1, the conventional LCD backlight unit includes a light source (10), a light guide plate (20), two diffusion sheets (30) (a first diffusion sheet for diffusing light coming from the light source and a second diffusion sheet for diffusing the light diffused by the first diffusion sheet to enhance the uniformity of the light), and a brightness enhancement film (BEF) (40) for enhancing brightness of the light diffused by the first and second diffusion sheets. In addition, the conventional LCD backlight unit may further include a reflection plate (50), a mold frame (not shown) and protective sheet (not shown).

The quality of screen image is dependent on the optical characteristic of light generated in the edge type BLU or the direct type BLU. Therefore, optical sheets are parts through which the light emitted from BLU become uniform and bright.

Particularly, since the LCD has advantages of slimness, lightweight, low power consumption and low driving voltage as compared with other display apparatuses, the LCD has been extensively employed in various industrial fields. To this end, however, the number of lamps has been reduced and the LED BLU has been employed. The optical sheet in BLU therefore acutely requires improvement in function of diffusion and brightness. A gain-diffuse plate having randomly distributed beads and being formed by using UV-resin, as shown in FIG. 2. is currently used as an optical sheet satisfying both the brightness and diffusion characteristic simultaneously.

The conventional random type gain diffuse plate is however still short of satisfying the requirements of low power consumption, high brightness and high diffusion characteristics in LCD despite the continuous developing efforts to improving brightness and diffusion function. The reason is that it difficult to control the optical characteristic according to the beads size due to the random distribution of beads. The disadvantage is caused by uncontrollability of packing factor and sag (lens height/lens diameter) of lens which are the most important factor for brightness and diffusion characteristics. As a result, the gain diffuse plate of regular shapes is currently required, but a gain diffuse plate having a large area is hardly commercialized yet. The reason is that the use of regular shaped or regular patterned plate makes moire phenomenon occur due to repeated periodicity on the LCD panel, which in turn causes decreased luminance of LCD panel and imbalance in a screen image, and which acts as limitation to application of the regular patterned sheets.

And, light bulbs such as fluorescent lamp, incandescent lamp was used as a light source at home. So quality of light is not good, and dazzling is brought about because the light bulbs are driven by commonly used alternating current frequency, which cause user's eye to be tired. To reduce the aforementioned disadvantage, optical sheet which can improve a luminance of light bulbs and reduce the eye-tiredness and prevent a amblyopia by being positioned at the light outlet, is required.

DISCLOSURE OF INVENTION

Technical Problem

Accordingly, the present invention is directed to a composite optical sheet that substantially solves one or more of the problems due to limitations and disadvantages of the related art.

Technical problems to be solved by the present invention are not restricted to the above-mentioned problems, and any other technical problems not mentioned so far will be clearly appreciated from the following description by skill in the art.

Solution to Problem

An object of the invention is to solve at least one or more of the above-mentioned problems and/or disadvantages in whole or in part and to provide at least the advantages described hereinafter. In order to achieve at least the above objects, in whole or in part, and in accordance with the purposes of the disclosure, as embodied and broadly described, there is provided a composite optical sheet configured to prevent moire patterns through an optical design of a lens in an optical sheet of regular shapes, and to maximize the brightness by forming lenses of optical sheet in different sizes.

In one general aspect of the present invention, there is provided a composite optical sheet, comprising: an optical sheet including a plurality of lenses to form a pattern, in which a distance between any one center of a lens and a center of a neighboring lens (lens pitch) is more than 1 μm but less than 30 μm.

In another general aspect of the present invention, there is provided a composite optical sheet, comprising: two or more optical sheets, in which one or more optical sheets including a plurality of lenses to form a pattern and having a distance of more than 1 μm but less than 30 μm between any one center of a lens and a center of a neighboring lens (lens pitch) is included.

In some exemplary embodiments of the present invention, the optical sheet whose lens pitch may be more than 1 μm but less than 30 μm is an upper sheet, and a ratio of a lens diameter of a lower sheet relative to that of the upper sheet may be more than 2 but less than 1,000.

In some exemplary embodiments of the present invention, a ratio of a lens height relative to the lens diameter may be more than 0.3 but less than 0.6.

In some exemplary embodiments of the present invention, a ratio (packing factor) of area of an optical sheet surface prior to formation of a lens pattern relative to an area occupied by the lens pattern may be more than 70% but less than 95%.

In still another general aspect of the present invention, there is provided a composite optical sheet, comprising: an optical sheet including a plurality of lenses to form a pattern, in which a discrete space is formed between neighboring lenses, and a concavely curved portion is formed in the discrete space.

In some exemplary embodiments of the present invention, the concavely curved portion is a circle or an oval tangent to a body of the optical sheet and to the surface of lens.

In some exemplary embodiments of the present invention, a diameter of the circle or a length of a major axis and a length of a minor axis may be more than 0.1 μm but less than 1,000 μm.

In some exemplary embodiments of the present invention, a lens arrangement may be a micro lens array or a lenticular lens array.

In some exemplary embodiments of the present invention, a shape of a horizontal cross-section of the lens may be circular or multi-angled.

In some exemplary embodiments of the present invention, a haze of the lens may be more than 65% but less than 95%.

Advantageous Effects of Invention

As explained in the foregoing, the present invention has an advantageous effect in that moire phenomenon can be prevented through optical design of lenses of regular patterned optical sheets and brightness can be maximized by forming lenses in different sizes.

The present invention has still another advantageous effect in that lenses on each optical sheet are arranged in regular pattern and concavely curved part is formed between lenses, to remove bright lines, to enhance diffusion and dispersion of light, and to achieve excellent uniformity of light, whereby the manufacturing cost of thin LCD can be reduced.

The present invention has still further advantageous effect in that manufacturing cost of backlight unit can be reduced and the backlight unit can be slimmed down, by reducing or eliminating the number of diffusion sheets required for uniformity of light, and by employing a micro lens array with a haze of more than 65% for elimination of bright lines.

BEST MODE FOR CARRYING OUT THE INVENTION

Configuration and operation of the present invention will be described in detail with reference to the accompanying drawings. Detailed descriptions of well-known functions, configurations or constructions are omitted for brevity and clarity so as not to obscure the description of the present invention with unnecessary detail.

The subject matter of the present invention is to provide a composite optical sheet with lenses whose lens pitch is 1~30 μm, whereby moire phenomenon can be removed and brightness can be maximized.

Figure 1:
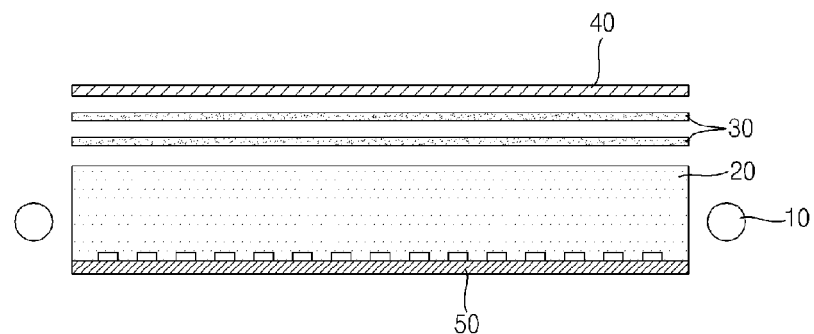
FIGS. 1 and 2 are schematic views illustrating a structure of backlight unit and a lens arrangement in random method according to related art.
Figure 2:
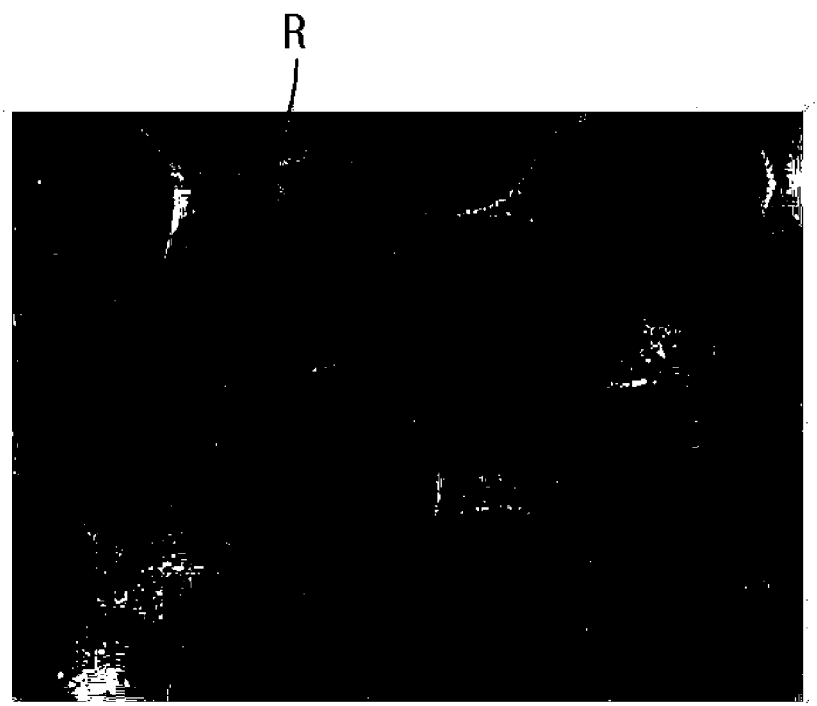
Figure 3:
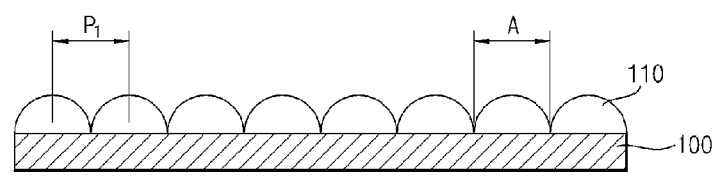
FIG. 3 is a conceptual view illustrating an essential part of a composite optical sheet according to the present invention.
Figure 3:
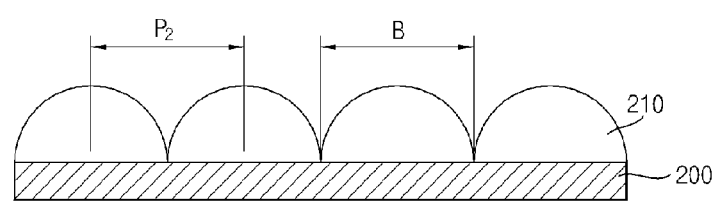

FIG. 3 is a conceptual view illustrating a cross-section of a composite optical sheet according to an exemplary embodiment of the present invention.

A composite optical sheet may comprising an optical sheet on which lenses with a lens pitch of 1~30 μm is arranged. Preferably, two or more optical sheets with regularly arranged lenses are stacked. However, the lenses may be irregularly arranged. More preferably, the present exemplary embodiment describes a structure in which an upper sheet and a lower sheet are stacked. The lens pitch herein described is a distance ($P_1$) between a center of any one lens and that of a neighboring lens.

The composite optical sheet according to the exemplary embodiment of the present invention has an upper sheet and a lower sheet with regularly arranged lenses, where a lens pitch of each optical sheet is preferably 1~30 μm. In a case the lenses are regularly arranged, the moire phenomenon occurs very seriously. However, the moire phenomenon is conspicuously reduced in a range of 1~30 μm in lens pitch, but not in other range.

The upper sheet (100) is a sheet for preventing the moire phenomenon, and the upper sheet has lenses of regular shapes and regular pitches, where each lens (110) is basically and preferably formed with a lens pitch of 1~30 μm.

Below the upper sheet (100), a lower sheet (200) with regularly-arranged lenses is placed, where each lens (210) of the lower sheet is basically and preferably formed with a lens pitch of 1~30 μm. The lower sheet has a function of maximizing the brightness characteristic of composite optical sheet according to the present invention, where size of each lens formed on the lower sheet (200) is preferably two times or more larger than that of each lens of the upper sheet (100). That is, preferably, a ratio (A/B) between a lens diameter (B) of the upper sheet and a lens diameter (A) of the lower sheet is 2 or more. A sag (lens height/lens diameter) of a lens arranged on the upper sheet and the lower sheet is preferably more than 0.3 but less than 0.6. Lenses on each sheet are preferably formed with a packing factor of more than 70% but less than 95%.

The composite optical sheet having an upper sheet and a lower sheet is employed to achieve the composite function in which the upper sheet functions to remove the moire phenomenon while the lower sheet functions to maximize the brightness. That is, the use of composite optical sheet according to the present invention can make the moire phenomenon avoided and the brightness maximized due to stacked structure of regular patterns. Thus composite optical sheet can be applied to a low-power consumed, environment-friendly and slimmed backlight unit.

Figure 4:
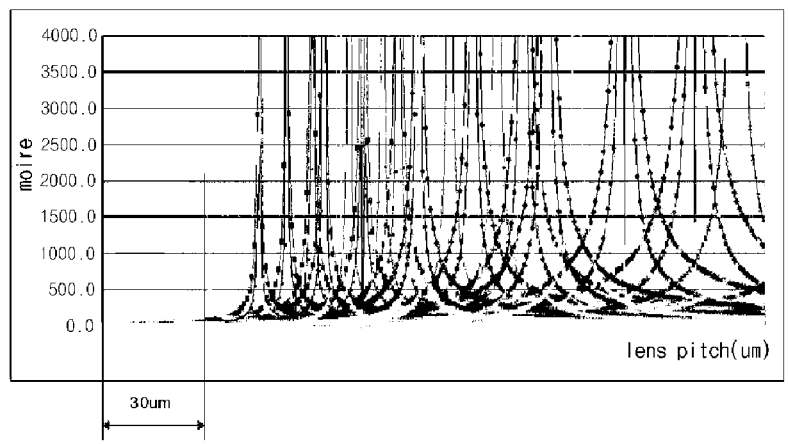
FIGS. 4 and 5 are graphs illustrating moire phenomenon removal and brightness improvement by a composite optical sheet according to the present invention.

FIG. 4 illustrates moire phenomenon based on lens pitches using the composite optical sheet according to the present invention. That is, as a result of applying various lens sizes on the backlight unit, it was confirmed from the result that the moire cannot be substantially observed in a lens pitch less than 30 μm.

Figure 5:
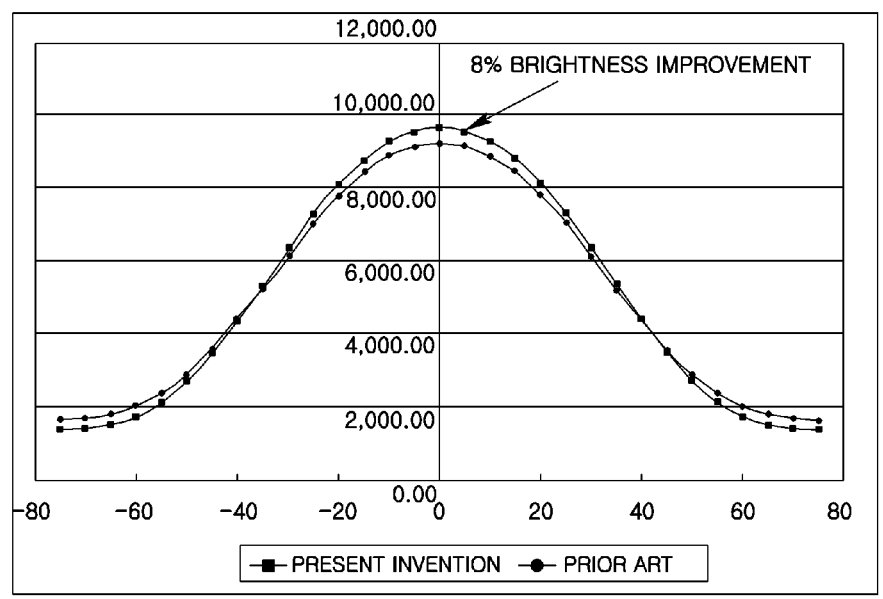

FIG. 5 is a graph illustrating brightness improvement by using a composite optical sheet according to the present invention, in which an approximately 8% increase in brightness over the conventional gain diffuse sheet is observed, which is the same or better result than that of the conventional prism sheet. The brightness improvement is a result of a stacked structure of the composite optical sheet according to the present invention, in which regular patterned optical sheets having mutually different lens sizes respectively are laminated.

Mode for the Invention

The regular pattern of lenses in the composite optical sheet according to the present invention may be structured in various shapes.

Figure 6:
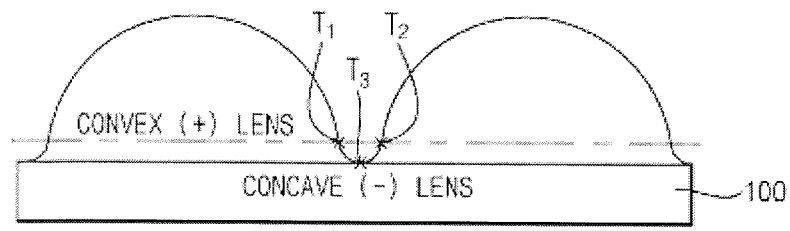
FIG. 6 is a schematic view illustrating a different embodiment of the present invention in lens arrangement.
Figure 6:
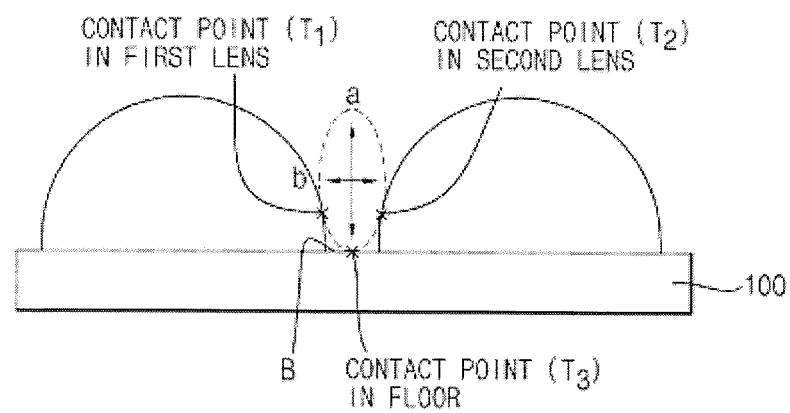
Figure 6:
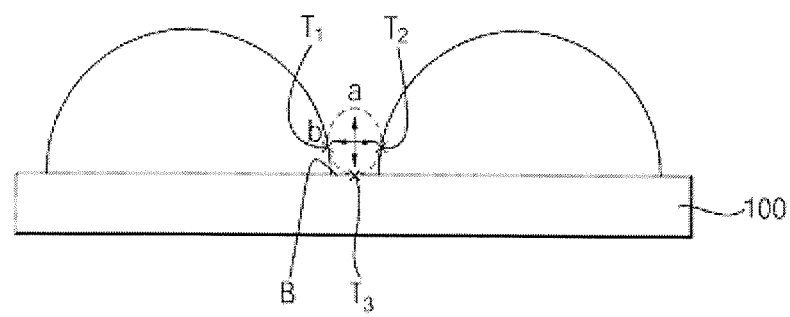

Referring to FIG. 6, the regular patterns of lens according to the present invention may be formed with each lens of identical size in repeated manner (no space between neighboring lenses) (see FIG. 3), or a concavely curved portion may be formed in a space between neighboring lenses.

FIG. 6(a) is a schematic view illustrating a discrete space formed between neighboring lenses and the discrete space formed with a concavely curved portion according to the present invention. In a case a discrete space is formed between neighboring lenses, a floor surface (B) of the discrete space is flat, such that light emitted from backlight unit in LCD penetrates the floor surface in a relatively straight way to allow the emitted light to be nonuniform (bright lines). The composite optical sheet according to the present invention is disclosed to solve the above mentioned nonuniform light (bright lines). That is, an imaginary oval body having a vertical major axis 'a' and a horizontal minor axis 'b' may be made to contact a contact point in first lens ($T_1$), a contact point in second lens ($T_2$) and a contact point in floor ($T_3$), where the space other than the lens, the imaginary oval body, and the floor is filled to form a concavely curved portion passing a contact point in first lens, a contact point in second lens and a contact point in floor.

As shown in FIGS. 6(b) and 6(c), the curved portion according to the present invention may become a sphere by adjusting the major axis 'a' and the minor axis 'b' of the imaginary oval body formed in the discrete space between lenses, and each length of the major axis and the minor axis is preferably adjusted within a range of 0.1 μm 1,000 μm.

The reason is that the brightness characteristic required for lens cannot be substantially satisfied and the haze cannot be also satisfied if each length of the major axis and the minor axis deviates from the given range. That is, the imaginary oval body formed in the discrete space between the lenses may form an imaginary sphere by adjusting lengths of the major axis 'a' and the minor axis 'b' and form a concavely curved portion passing the contact points of the first lens, the second lens, and the floor.

The concavely curved portion formed between the neighboring lenses has a function of diffusing light, as opposed to the convex style having light-collecting characteristic. Therefore, diffusion and dispersion of light and uniformity of light can be further enhanced.

The arrangement of lenses in the composite optical sheet according to the present invention may be a micro lens array or a lenticular lens array. Furthermore, a shape of a horizontal cross-section of each lens may be circular or multi-angled. At this time, a haze of the lens is preferably in the range of 65%~95%, whereby the removal efficiency of bright lines can be maximized.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

INDUSTRIAL APPLICABILITY

The present invention has industrial applicability in that the moire phenomenon can be minimized but the brightness can be maximized by using the composite optical sheet with multi-stack structure.

The present invention has further industrial applicability in that the number of diffusion sheets used for uniformity of light can be reduced even in the direct-type backlight unit, and the manufacturing cost of each unit can be reduced along with the realization of slimness.

The invention claimed is:

1. A composite optical sheet, comprising:
a lower sheet and an upper sheet,
wherein the upper sheet and the lower sheet each includes a transparent flat plate-shaped body and a plurality of lenses arranged on a surface of the body to form a regular pattern, in which a distance between any one center of a lens and a center of a neighboring lens is more than 1 μm but less than 30 μm,
wherein a ratio of a lens diameter of the lower sheet relative to that of the upper sheet is more than 2 but less than 1,000,
wherein a concavely curved portion is formed at a discrete space formed between lenses of the plurality of lenses of the lower sheet in a body direction,
wherein the concavely curved portion is a circle or an oval tangent to the body of the optical sheet and to the lens, and
wherein a diameter of the circle or a length of a major axis and a length of a minor axis is more than 0.1 μm but less than 1,000 μm.

2. The composite optical sheet of claim 1, wherein a ratio of a lens height relative to the lens diameter is more than 0.3 but less than 0.6.

3. The composite optical sheet of claim 1, wherein a ratio of area of an optical sheet surface prior to formation of a lens pattern relative to an area occupied by the lens pattern is more than 70% but less than 95%.

4. The composite optical sheet of claim 1, wherein a haze of the lens is more than 65% but less than 95%.

5. The composite optical sheet of claim 1, wherein a lens alignment is a micro lens array or a lenticular lens array.

6. The composite optical sheet of claim 1, wherein a shape of a horizontal cross-section of the lens is circular or multi-angled.

7. The composite optical sheet of claim 1, wherein an alignment of the plurality of lenses of at least one of the upper sheet and the lower sheet is a micro lens array or a lenticular lens array.

* * * * *